(12) United States Patent
Krisher

(10) Patent No.: US 6,283,186 B1
(45) Date of Patent: Sep. 4, 2001

(54) TIRE INFLATION SYSTEM FOR LIVE SPINDLE WHEEL END

(75) Inventor: James A. Krisher, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/447,550

(22) Filed: Nov. 23, 1999

(51) Int. Cl.[7] .................................................. B60C 23/00
(52) U.S. Cl. ............................................................ 152/417
(58) Field of Search .................... 152/415, 416, 152/417

(56) References Cited

U.S. PATENT DOCUMENTS

| | | |
|---|---|---|
| 1,083,847 | 1/1914 | McDowell et al. . |
| 1,234,962 | 7/1917 | Tarbet . |
| 1,800,780 | 4/1931 | Daneel . |
| 1,849,139 | 3/1932 | Denmire . |
| 2,090,089 | 8/1937 | Wiegand . |
| 2,634,784 | 4/1953 | Fitch . |
| 2,908,241 | 10/1959 | Todd . |
| 3,705,614 * | 12/1972 | Juttner et al. ........................ 152/417 |
| 4,431,043 * | 2/1984 | Goodell et al. ....................... 152/417 |
| 4,492,019 | 1/1985 | Wells et al. . |
| 4,498,709 | 2/1985 | Wells et al. . |
| 4,582,107 | 4/1986 | Scully . |
| 4,805,681 * | 2/1989 | Vollmer et al. ....................... 152/417 |
| 4,844,138 | 7/1989 | Kokubu . |
| 4,932,451 | 6/1990 | Williams et al. . |
| 5,587,698 * | 12/1996 | Genna .................................. 340/442 |

\* cited by examiner

*Primary Examiner*—Russell D. Stormer
(74) *Attorney, Agent, or Firm*—Liniak, Berenato, Longacre & White

(57) ABSTRACT

A central tire inflation system for live spindle wheel ends is disclosed. The live spindle wheel end provides a passage for the routing of air between a central source and a vehicle pneumatic tire. The live spindle wheel end comprises a steering knuckle fixed to a vehicle, a bearing assembly secured to the steering knuckle, and a rotatable spindle mounted within the bearing assembly, driven by a drive shaft of a vehicle transmission. A rubbing slip-ring seal is mounted into a flange portion of the steering knuckle provided a seal chamber between a flange portion of the knuckle and a flange portion of the drive shaft, sealing an air passage between the stationary knuckle and the drive shaft. A communication passage is formed through the drive shaft providing a fluid communication between the seal chamber and the pneumatic tire.

5 Claims, 1 Drawing Sheet

TIRE INFLATION SYSTEM FOR LIVE SPINDLE WHEEL END

FIELD OF THE INVENTION

The present invention relates to vehicle live spindle wheel end systems in general and particularly to a central tire inflation system for live spindle wheel ends.

BACKGROUND OF THE INVENTION

There are two general categories of motor vehicle wheel end assemblies: dead spindle and live spindle. Dead spindle wheel end assemblies generally include a non-rotatable spindle extending outward from a mounting member typically attached to a vehicle chassis. A wheel hub including a wheel mounting flange, is supported for rotation on the spindle by bearings. A wheel and tire assembly are then attached to the wheel mounting flange so that the wheel is mounted coaxially with the spindle and wheel hub.

Live spindle wheel end assemblies generally include a spindle that is supported for rotation by bearings within a bore formed in a mounting member such as a steering knuckle which is attached to the vehicle chassis. A wheel mounting flange is formed in the spindle or is secured thereto by welding or other suitable methods. To provide the live spindle wheel end assembly for use of a four-wheel drive vehicle, a bore is formed through the spindle to accept a drive axle.

The central tire inflation system is adapted to provide compressed air from a remote pressurized air source to a pneumatic tire of a motor vehicle. Since the tire is rotating and the pressurized air source is stationary, the typical tire inflation system includes some kind of sealing means located between a stationary member of the wheel end assembly and a rotating tire mounting spindle. The typical tire inflation system also is provided with a conduit that extends from the sealing means through the wheel end assembly to the pneumatic tire. It has been found particularly difficult to design the tire inflation system for live spindle wheel ends wherein pressurized air is transmitted from the fixed inflation air source to pneumatic tires mounted on steering wheels of a drive axle.

Current systems are quite complex, cumbersome, expensive and require a great deal of changes in the current production wheel end design.

SUMMARY OF THE INVENTION

The present invention alleviates the drawbacks of the prior art. The present invention provides a central tire inflation system for a live spindle wheel end assembly providing a unique arrangement for a steerable driving axle that minimized changes in the current production wheel end designs.

In the preferred embodiment disclosed, the live spindle wheel end assembly comprises a steering knuckle fixed to the vehicle, and a bearing assembly secured to the steering knuckle. The bearing assembly receives a rotatable coaxial spindle to which a pneumatic tire is mounted. The spindle has a central axial bore provided with a spline section. The drive shaft has a spline portion and a flange portion. The drive shaft is inserted through the central spindle bore such that respective splined portions form a spline connection. An inlet passage is formed in the steering knuckle extending radially through a flange portion of the knuckle. A rubbing slip-ring seal is press fitted into the flange portion of the steering knuckle providing a seal chamber between the flange portion of the knuckle and the flange portion of the drive shaft. The inlet passage transmits pressurized air from an air supply line to the seal chamber through a hole in the rubbing seal. A communicating passage in the form of an axial bore and a radial bore is drilled through the drive shaft providing via a suitable outlet means a fluid communication between the seal chamber and the pneumatic tire.

BRIEF DESCRIPTION OF THE DRAWINGS

Other objects and advantages of the invention will become apparent from a study of the following specification when viewed in light of the accompanying drawings, wherein.

DETAILED DESCRIPTION

Figure 1:
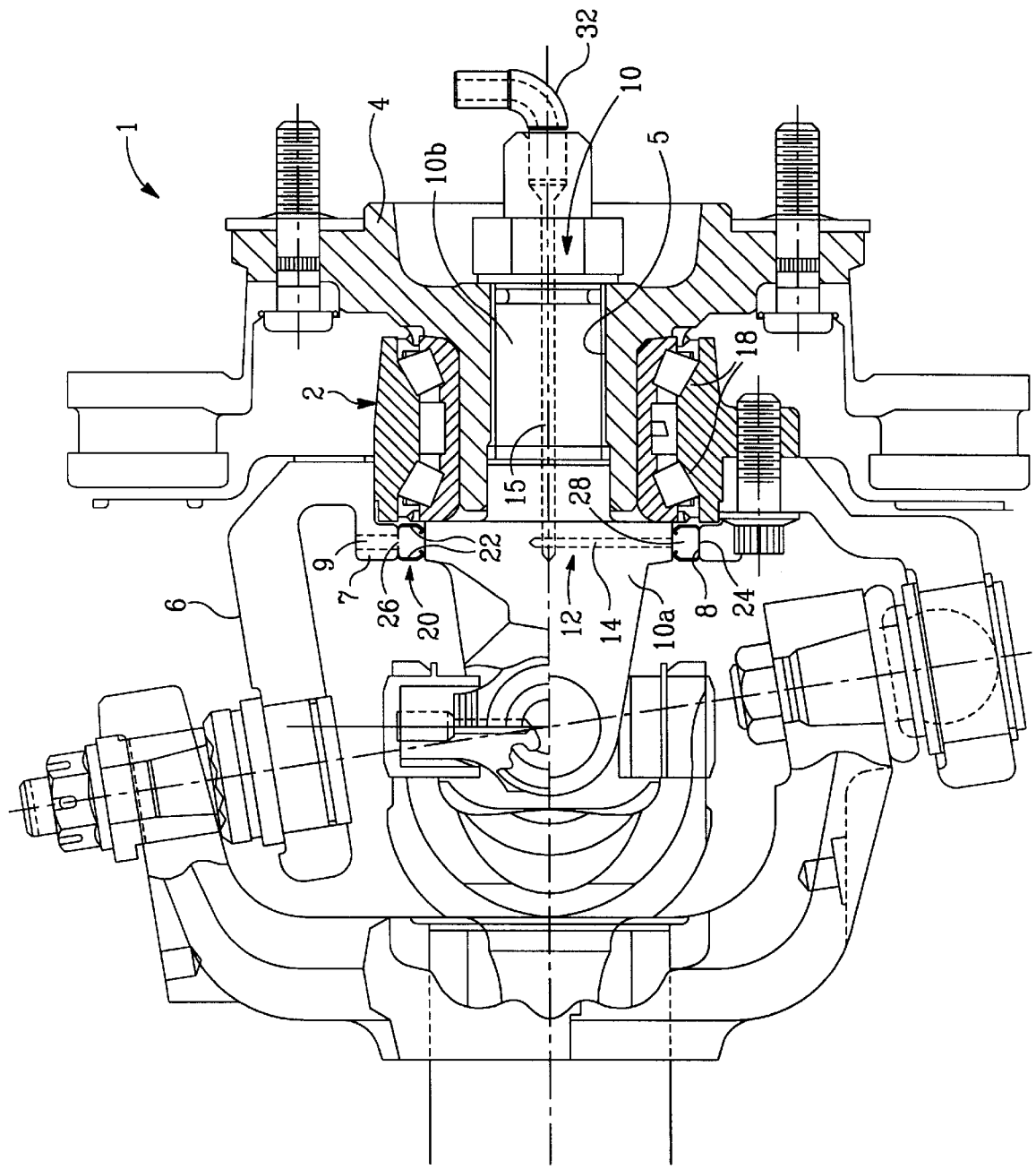
FIG. 1 is a cross-sectional view of the vehicle wheel and part of the axle assembly according to the present invention.

FIG. 1 depicts a live spindle wheel end assembly for motor vehicle including wheels (not shown) that are both driving and steering. The live spindle wheel end assembly of the present invention, designated generally at 1, comprises a bearing assembly 2 and an inner spindle 4 supported coaxially rotatably within the bearing assembly 2 by a pair of roller bearings 18. The spindle 4 has a central bore having a cylindrical splined portion 5. A wheel with a pneumatic tire (not shown) is mounted to the spindle 4.

The wheel end assembly of the present invention being driving type includes a drive shaft 10 comprised of a cylindrical flange portion 10a and a splined end 10b. The splined end 10b of the drive shaft 10 is inserted through the spindle 4 with splines of the splined portion 5 of the spindle bore and splines of the splined end 10b of the drive shaft 10 interfitted to provide non-turning, driving connection.

The wheel end assembly of the present invention being steerable also includes a steering knuckle 6 actuated through a steering arm (not shown). The steering knuckle is conventionally fastened to the bearing assembly 2. The steering knuckle 6 is provided with a knuckle flange 7 forming a cylindrical inner peripheral surface 8 coaxial with the flange portion 10a of the shaft 10 but being radially spaced form its outer peripheral surface.

A pressurized air path to the pneumatic tire begins with an inlet air passage 9 formed radially through the steering knuckle 6. A pressurized air supply line (not shown) is conventionally attached to the inlet passage 9.

A rubbing slip-ring seal 20 is mounted to the inner cylindrical peripheral surface 8 of the knuckle flange 7 by press fitting or any other appropriate manner. The slip-ring seal 20 comprises a pair of axially spaced annular projections 22 extending radially inwardly from an annular ring 24. The innermost ends of the projections 22 are in friction sealing contact with the outer peripheral surface of the flange portion 10a of the drive shaft 10, thus forming an annular seal chamber 28 that is a space defined by projections 22, the ring 24 and the outer peripheral surface 11 of the flange portion 10a. The annular ring 24 of the slip-ring seal 20 includes a communication hole 26 aligned with the inlet passage 9 in the knuckle 6, thus providing a fluid communication between the inlet passage 9 and the rolling seal chamber 28.

In order to provide a fluid communication between the rolling seal chamber 28 and the pneumatic tire, the drive shaft 10 includes a communication passage 12 formed therethrough. In the preferred embodiment of the present invention, the communication passage 12 comprises a radial bore 14 and an axial bore 15 being in fluid communication with each other. The radial bore 14 extends in the radial direction of the drive shaft 10. An open end of the radial bore 14 opens in the annular seal chamber 28. The axial bore 15 extends in an axial direction of the drive shaft 10, and has an open end opened at an end face of the drive shaft 10. The open end portion of the axial bore 15 is in fluid communication with an interior space of the pneumatic tire through a fitting 32 coupled by an outlet air tube (not shown) to the pneumatic tire.

Therefore, a continuous air passage through the wheel assembly is achieved. Again, with the reference in FIG. 1, the onboard central tire inflation system can communicate with the fitting 32 through the wheel end assembly 1 to permit inflation and deflation of the tire. The overall path includes the inlet air passage 9 through the knuckle 6, an annular seal chamber 28, and the communication passage through the drive shaft 10, connected to the fitting 32.

While in accordance with the provisions of the Patent Statutes the preferred embodiments of the present invention has been illustrated and described, it will be apparent to those of ordinary skill in the art that various changes, modifications or variations may be easily made without deviating from the scope of the invention.

What is claimed is:

1. A vehicle live spindle wheel end assembly including a tire inflation system providing pressurized air communication through said wheel end assembly, comprising:
    a steering knuckle;
    an inlet passage formed through said knuckle, said inlet passage connected to a pressurized air supply line;
    a stationary member secured to said steering knuckle;
    a coaxial rotatable member to which a pneumatic tire is mounted, said rotatable member having a cylindrical outer peripheral surface;
    a rubbing slip-ring seal mounted on said knuckle; said seal forming a seal chamber between said knuckle and said rotatable member, said chamber being in communication with said inlet passage in said knuckle;
    a communication passage extending through said rotatable member, said passage being in communication with the pneumatic tire at one end and with said seal chamber at another end;
    wherein said rubbing slip-ring seal includes a pair of axially spaced annular projections radially inwardly extending from an annular ring of said seal, said projections being a sliding contact with said cylindrical outer peripheral surface of said rotatable member, said spaced projections, said annular ring and said outer peripheral surface of said rotatable member define said seal chamber;
    whereby, pressurized air may flow through said communication passage from said inlet passage in said knuckle to said pneumatic tire.

2. A vehicle live spindle wheel end assembly including a tire inflation system providing pressurized air communication through said wheel end assembly, comprising:
    a stationary outer hub;
    an inner coaxial rotatable spindle to which a pneumatic tire is mounted, said spindle further having a central bore therethrough including a splined section;
    a steering knuckle secured to said stationary hub;
    an inlet passage formed through said knuckle connection to a pressurized air supply line;
    a drive shaft having a spindle section at one end defining a cylindrical outer peripheral surface and a flange section at the other end, said drive shaft is received through said central bore in said spindle forming a spline connection;
    a rubbing slip-ring seal mounted on said knuckle; said seal forming a rolling seal chamber between said knuckle and said drive shaft, said chamber being in communication with said inlet passage in said knuckle;
    a communication passage extending through said drive shaft, said passage being in communication with the pneumatic tire at one end and with said rolling seal chamber at another end;
    whereby, pressurized air may flow through said communication passage from said inlet passage in said knuckle to said pneumatic tire.

3. The vehicle live spindle wheel end assembly as defined in claim 2 wherein said communication passage includes an axial bore axially extending through said drive shaft, and a radial bore extending radially inwardly from said flange section of said drive shaft to terminate at said axial bore, said axial bore being in communication with the pneumatic tire at one end and with said radial bore at the other end, said radial bore being in communication with said rolling seal chamber at one end with said axial bore at the other end.

4. The vehicle live spindle wheel end assembly as defined in claim 2 wherein said rubbing slip-ring seal includes a pair of axially spaced annular projections radially inwardly extending from an annular ring, said projections being in sliding contact with said cylindrical outer peripheral surface of said drive shaft, said spaced projections, said annular ring and said outer peripheral surface of said drive shaft define said seal chamber.

5. A vehicle live spindle wheel end assembly including a tire inflation system providing pressurized air communication through said wheel end assembly, comprising:
    a steering knuckle;
    an inlet passage formed through said knuckle connected to a pressurized air supply line;
    a bearing assembly secured to said steering knuckle;
    an inner coaxial rotatable spindle to which a pneumatic tire is mounted, said spindle further having a central bore therethrough including a splined section;
    a drive shaft having a spindle section at one end defining a cylindrical outer peripheral surface and a flange section at the other end, said drive shaft is received through said central bore in said spindle forming a spline connection;
    a rubbing slip-ring seal mounted on said knuckle; said seal forming a rolling seal chamber between said knuckle and said drive shaft, said chamber being in communication with said inlet passage in said knuckle;
    said rubbing slip-ring seal includes a pair of axially spaced annular projections radially inwardly extending from an annular ring, said projections being in sliding contact with a cylindrical outer peripheral surface of said drive shaft, said spaced projections, said annular ring and said outer peripheral surface of said drive shaft define said seal chamber;
    a communication passage extending through said drive shaft, said passage being in communication with the pneumatic tire at one end and with said rolling seal chamber at another end;
    said communication passage includes an axial bore axially extending through said drive shaft, and a radial bore extending radially inwardly from said flange section of said drive shaft to terminate at said axial bore, said axial bore being in communication with the pneumatic tire at one end and with said radial bore at the other end, said radial being in communication with said rolling seal chamber at one end and with said axial bore at the other end;

whereby, pressurized air may flow through said communication passage from said inlet passage in said knuckle to said pneumatic tire.

* * * * *